United States Patent [19]

Cook

[11] Patent Number: 4,886,608
[45] Date of Patent: Dec. 12, 1989

[54] APPARATUS AND METHOD FOR SEPARATING LIQUIDS AND SOLIDS

[76] Inventor: Gary E. Cook, 2209 East Y St., Vicksburg, Mich. 49097

[21] Appl. No.: 261,777

[22] Filed: Oct. 24, 1988

[51] Int. Cl.[4] .............................................. B01D 33/36
[52] U.S. Cl. .................................... 210/785; 210/791; 210/353; 210/356; 210/389; 210/406; 210/412; 209/380; 209/409
[58] Field of Search ............... 210/785, 791, 353, 356, 210/389, 391, 406, 407, 412, 416.1, 498; 198/752, 771; 209/380, 409; 193/2 B

[56] References Cited

U.S. PATENT DOCUMENTS

| | | | |
|---|---|---|---|
| 1,161,660 | 5/1913 | Caldecott . | |
| 2,329,333 | 9/1943 | Carter | 210/389 |
| 2,462,878 | 3/1949 | Logue | 210/389 |
| 3,336,701 | 8/1967 | Moore . | |
| 3,361,262 | 1/1968 | Orr et al. . | |
| 3,438,503 | 4/1969 | Carpenter . | |
| 3,478,406 | 11/1969 | Auckland . | |
| 3,633,753 | 1/1972 | Petitjean | 210/356 |
| 3,741,389 | 6/1973 | Anderson | 210/791 |
| 3,970,552 | 7/1976 | Bongert . | |
| 4,233,157 | 11/1980 | Miller . | |
| 4,371,490 | 2/1983 | Geessink | 210/498 |
| 4,482,046 | 11/1984 | Kraus | 198/771 |
| 4,526,682 | 7/1985 | Wallace | 210/353 |
| 4,787,502 | 11/1988 | Sullivan et al. | 198/771 |

FOREIGN PATENT DOCUMENTS

| | | |
|---|---|---|
| 2834497 | 2/1980 | Fed. Rep. of Germany . |
| 3624338 | 1/1988 | Fed. Rep. of Germany . |
| 1198443 | 12/1959 | France . |
| 5532404 | 8/1983 | Japan . |
| 1242212 | 7/1986 | U.S.S.R. . |

Primary Examiner—Richard V. Fisher
Assistant Examiner—Christopher Upton

[57] ABSTRACT

An apparatus for separating liquids and solids from a mixture thereof comprises a trough structure (12) in which is suspended a filter means (14) on which the mixture can be placed. A vacuum mechanism (16) draws a vacuum beneath the filter means to draw the liquids downwardly from the solids, and a oscillating mechanism (20) causes the remaining solids on the filter to move in a conveying direction. A flexible perforated sheet (60) is provided beneath and in generally continuous contact with the filter means (14) and which can be intermittently flexed to maintain the filter means unobstructed by solids.

10 Claims, 3 Drawing Sheets

APPARATUS AND METHOD FOR SEPARATING LIQUIDS AND SOLIDS

BACKGROUND OF THE INVENTION

1. Field of the Invention

This invention relates to separators of liquids and solids of the type which vibrate or oscillate. More particularly, the invention is directed to an improved vibratory cleaning mechanism for those of such separators which employ screens or like filter media.

2. Description of the Prior Art

Vibrating or oscillating separating devices employing horizontal screens and filters are well known in the art of separating solids and liquids from a mixture thereof. Such separators typically employ a process whereby a mixture of liquids and solids is applied to the exterior surface of a rotating drum or the top surface of a trough table which, in either case, comprises a liquid permeable separation member having a screen mesh or filter medium. From the interior of the drum, or from the underside of the table, respectively, the liquid is drawn away from the mixture through the filter medium by the application of a vacuum. The filter is either suspended under tension or supported by a rigid plate. The separation is further enhanced by vibration or oscillation which tends to cause the mixture to move along the permeable separation member in a conveying manner whereby the solids can be extracted from its upper surface and the liquids collected in a tank below its lower surface. Where a rigid support plate is used, apertures in the plate permit the liquid portion of the mixture to flow downwardly through the plate.

It is also known that the filter media frequently becomes clogged, necessitating the use of a cleaning mechanism to keep it clear. Previous devices have used scrapers to remove compacted or caked solids from the filter. Other mechanisms employ sprayers which act to backwash liquid from the underside of the filter to unclog the pores of the filter.

SUMMARY OF THE INVENTION

The invention relates to an improved means for cleaning the filter media in a device for separating liquids and solids from a mixture thereof. The separator device comprises a trough structure, a generally horizontally extending filter means positioned in the trough structure and adapted to receive a mixture of liquids and solids on its upper surface, a means for producing a vacuum beneath the filter means, and an oscillating means connected to the trough structure to cause the solids on the filter means to move in a conveying direction. According to the invention, a flexible perforated sheet is provided beneath and in generally continuous contact with the filter means. Also, a means is provided for intermittently flexing the perforated sheet in order to keep the filter means unobstructed by the solids.

The flexible perforated sheet is preferably formed of polypropylene, and may be intermittently flexed by pulsating the vacuum.

Means are provided at a downstream end of the trough structure for directing the solids separated from the mixture out of the trough. The apparatus may further provide means for withdrawing the liquid from the trough structure. Preferably, the solid removal means comprises a lip formed at a downstream end of the trough with steps formed on an inner surface of the lip. The means for withdrawing the liquid from the trough structure preferably comprises at least one duct providing open communication between the lower portion of the trough structure and a holding tank.

The invention also provides a method of separating liquids and solids from a mixture thereof comprising the steps of (1) depositing a mixture of liquids and solids on an upper surface of a generally horizontally extending filter means positioned in a trough structure such as that described above; (2) applying an oscillating movement to the trough structure to move the mixture in a conveying direction; (3) applying a vacuum beneath the filter means to draw the liquid downwardly from the solids; and (4) intermittently flexing a perforated sheet beneath and in generally continuous contact with the filter means to keep it clean. The method may include the additional step of pulsating the vacuum in order to facilitate flexing of the perforated sheet.

BRIEF DESCRIPTION OF THE DRAWINGS

The invention will now be described with reference to the accompanying drawings in which.

DESCRIPTION OF THE PREFERRED EMBODIMENT

Figure 1:
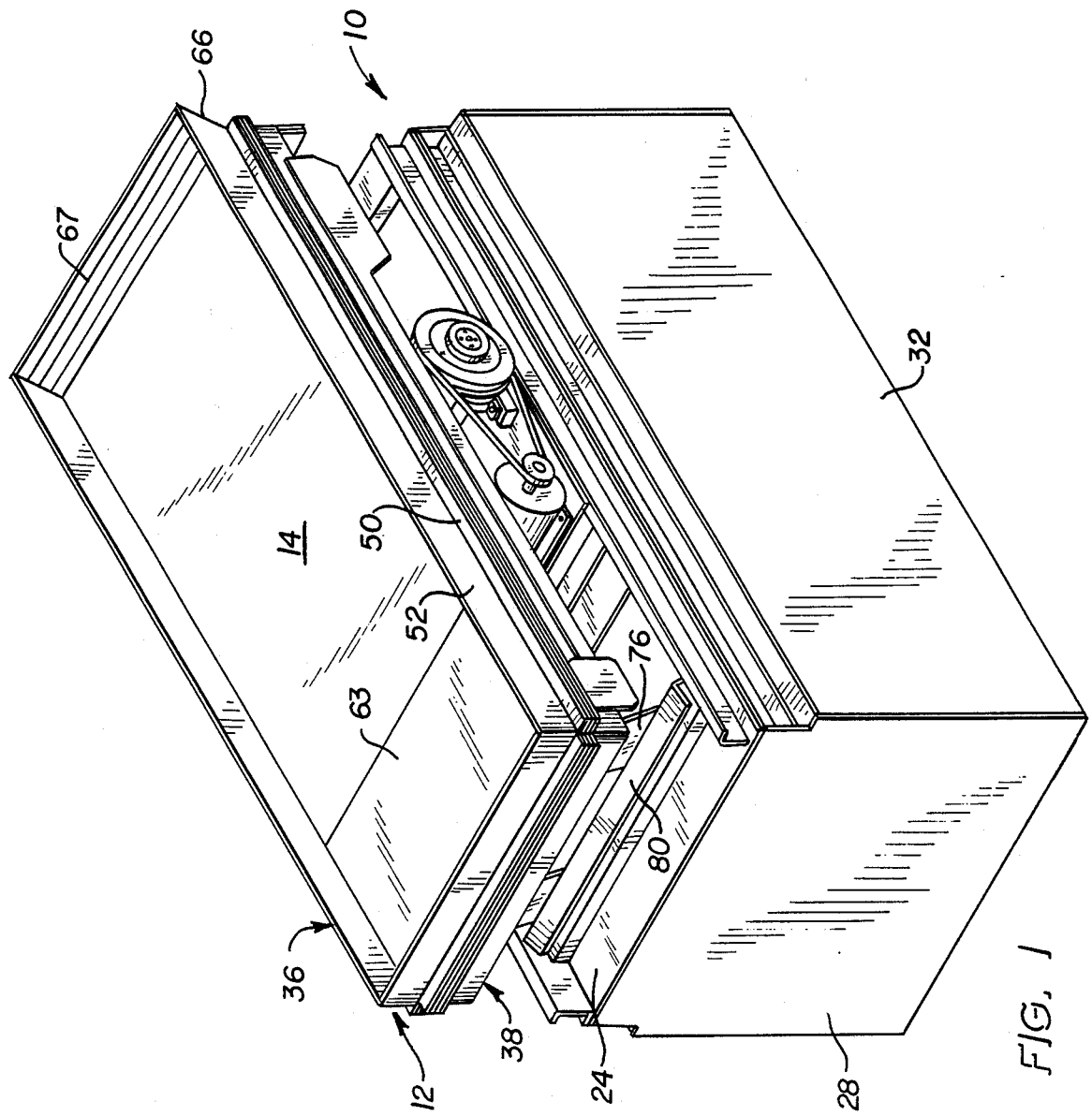
FIG. 1 is a front perspective view of a separation apparatus in accordance with the invention.

A separation device 10 for separating liquids and solids from a mixture thereof in accordance with the invention is shown generally in FIG. 1. The separation device 10 comprises a trough structure 12 in which is mounted a filter means 14. There is also provided a vacuum mechanism 16 to produce a pressure gradient across the filter means 14, a liquid removal means 18 for removing liquid from the trough structure 12, and an oscillating mechanism 20 to induce an oscillating or vibrating movement in the trough structure 12. The entire separation device 10 is mounted on a support structure 22.

The support structure 22 is adapted to rest on a floor or platform (not shown) and comprises a top wall 24, a bottom wall 26, an upstream end wall 28, a downstream end wall 30, two oppositely disposed lateral walls 32, and an intermediate wall 34. A compartment defined by the intermediate wall 34, the bottom wall 26, the top wall 24, the downstream end wall 30, and the two lateral walls 32 serves as a holding tank 35 for temporary storage of separated liquids during and after operation of the device, as will be hereinafter described in detail.

The trough structure 12 comprises an upper rectangular frame member 36, L-shaped in cross section, and a lower trough section 38. The lower trough section 38 has a bottom wall 40, an upstream end wall 42, a downstream end wall 44, and a pair of oppositely disposed side walls 46. A flange 48 extends laterally outwardly from each of the lower trough section walls 40, 42, 44, 46.

Figure 4:
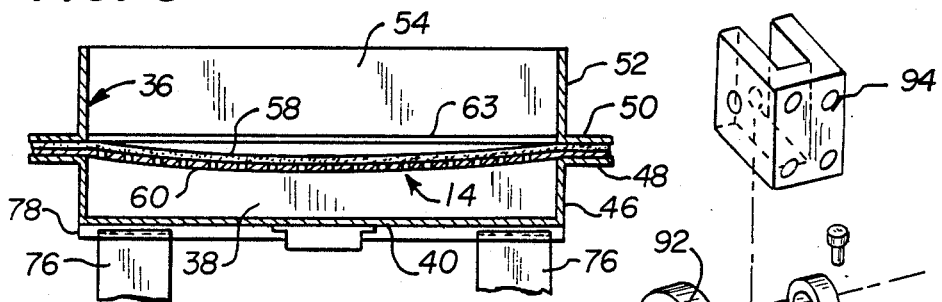
FIG. 4 is an enlarged cross-sectional view taken along line 4—4 of FIG. 2.

The upper rectangular frame member 36 is provided with a flange portion 50 which is roughly complementary in shape and orientation to the flanges of the lower trough section 38. A wall portion 52 extends upwardly from the flange portion 50 of the upper rectangular frame member 36. The filter means 14 is interposed between the flange portion 50 of the upper member 36 and the flanges 48 of the lower trough section 38, thus dividing the trough structure 12 into an upper trough 54 and a lower chamber 56. The structure of the connection between the upper frame member 36, the filter means 14 and the lower trough section 38 can be seen more clearly in FIG. 4. The filter means 14 comprises a filter medium 58 positioned above and adjacent to a flexible supporting sheet 60 and in generally continuous contact therewith. The filter 58 can be any well known conventional filter medium customarily used in the industry such as stainless steel screen called "wire cloth" or a similarly woven or fibrous material. The flexible supporting sheet 60 is preferably made of a resilient material such as polypropylene or polyurethane. The sheet is also perforated throughout to permit the flow of liquid through the sheet, but the sheet also retains sufficient solid surface area to enable the pressure gradient to act upon it. The filter means 14 is thus suspended between the upper frame member 36 and the lower trough section 38 and secured between the flanges by conventional means. A conventional sealant may be placed around the perimeter of the flanges 48, 50 at the interface with the filter means 14 to create a water tight seal.

A deflection plate 63 is mounted internally of the frame member 36 and above the filter at the upstream end 64 of the trough structure 12 in order to deflect the liquid-solid mixture and protect the filter as the mixture is received in the upper trough.

The downstream end 65 of the trough structure 12 terminates in an upwardly sloping lip 66. The trough structure 12 is preferably so dimensioned that the lip 66 will extend beyond the support structure 22. The lip 66 serves to direct the separated solid material out of the trough structure. Such direction may be enhanced by the use of laterally extending weldments 67 on an inner surface of the lip 66 to facilitate the steplike movement of the solid particles up the inclined lip.

The vacuum mechanism 16 comprises a conventional vacuum pump 68 arranged to draw a vacuum on the holding tank 35. The pump is preferably mounted on or in the support structure 22 and in open communication with the tank 35. Because the tank 35 is similarly in open communication with the lower chamber 56 through the liquid removal means 18, the vacuum is also drawn on the lower chamber to create a pressure gradient across the filter means 14.

The liquid removal means 18 comprises one or more flexible ducts 70, 72 mounted to and between the lower trough section bottom wall 40, and the liquid collection tank 35 defined by the supporting structure 22. The ducts 70, 72 may be clamped at each end to conventional pipe nipples 73. Liquid being drawn through the filter means exits the lower chamber 56 through an aperture (not shown) in the lower chamber corresponding with each pipe nipple and through the ducts 70, 72 into the collection tank 35. A liquid removal pump 74 can be applied to the collection tank 35 for removal to an appropriate waste disposal or recovery system.

Figure 2:
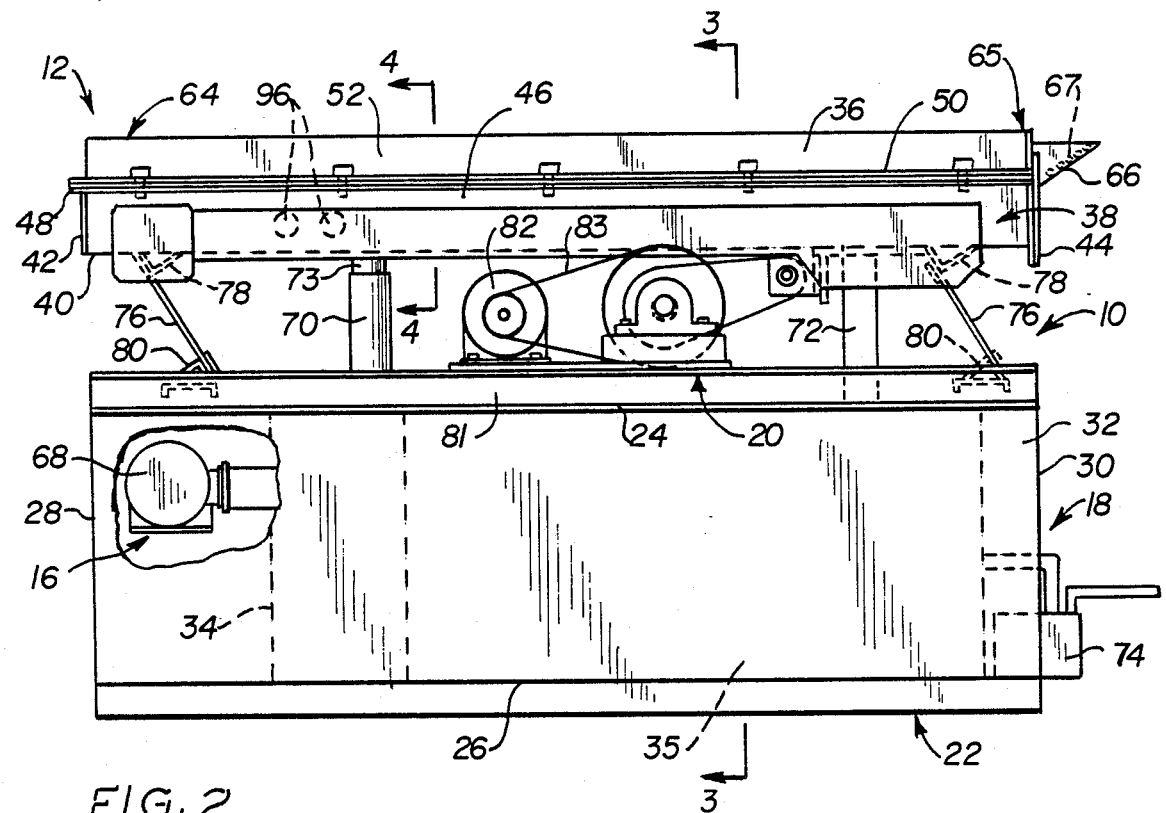
FIG. 2 is a side elevational view of the separation apparatus of FIG. 1.
Figure 3:
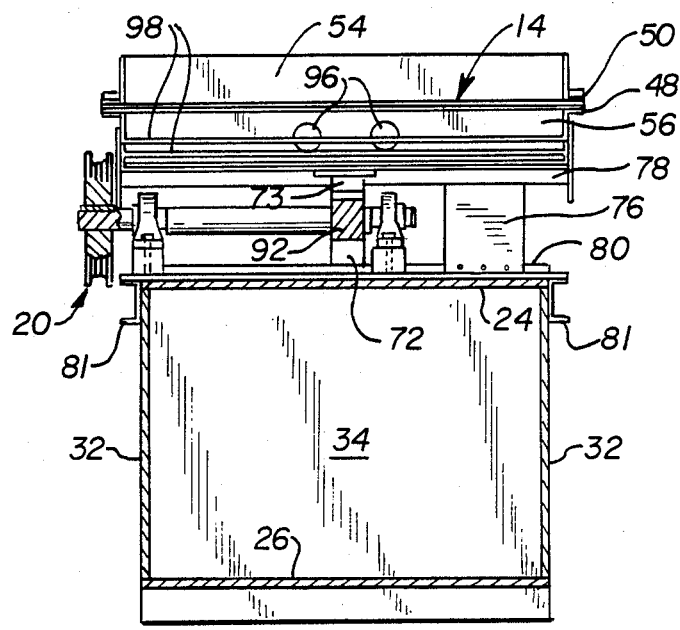
FIG. 3 is a sectional view taken along line 3—3 of FIG. 2.
Figure 5:
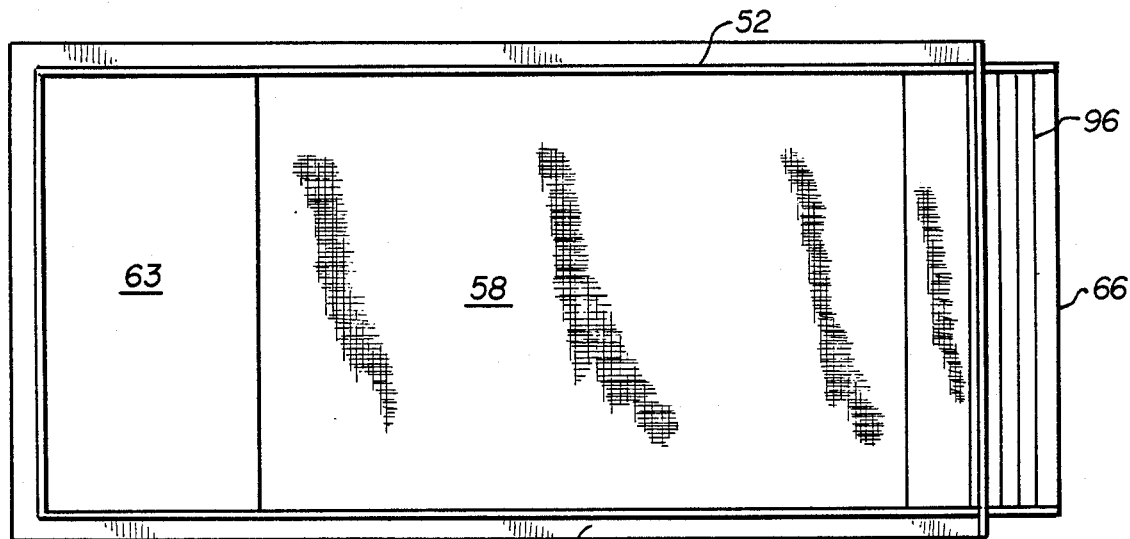
FIG. 5 is a top plan view of the separation apparatus of FIGS. 1 to 4.

The trough structure 12 is mounted to and spaced vertically above the support structure 22 by flexible supports 76. Each support 76 is formed of a rectangular fiberglass plate to provide some degree of rigidity, yet afford the capability of flexing laterally. As shown more clearly in FIG. 2, each support is mounted at one end to an upper mounting bracket 78 rigidly fastened to the lower trough section bottom wall 40 and at the other end to a lower mounting bracket 80, respectively. Each end of the lower mounting bracket 80 is rigidly secured, as by welding, to a rail 81 which in turn is mounted to the support structure 22. Preferably, at least two lower mounting brackets 80 thus extend laterally between parallel rails 81, and at least two flexible supports 76 extend between each upper mounting bracket 78 and lower mounting bracket 80. Each mounting bracket 78, 80 is oriented so as to position the supports 76 at an angle offset from the vertical, whereby to better facilitate the movement generated by the oscillating mechanism 20, as will be hereinafter described.

Figure 6:
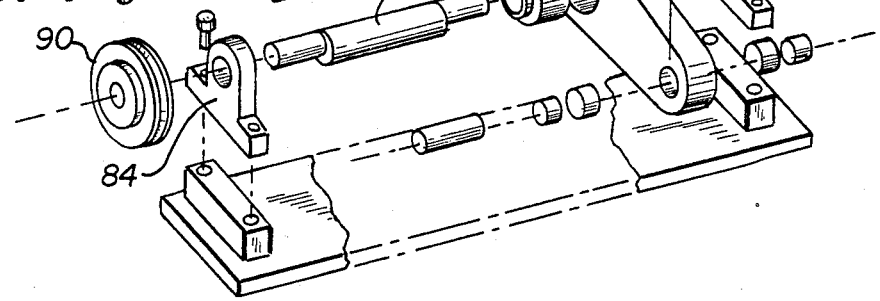
FIG. 6 is an exploded view of an oscillation mechanism of the separation apparatus of FIGS. 1 to 5.

The oscillating mechanism 20 is mounted to the support structure 22 between the rails 81 and is adapted to create a motion in the trough structure 12 whereby a mixture placed on the filter means will tend to move in a conveying manner from the upstream end 64 of the trough structure 12 toward the downstream end 65. The oscillating mechanism 12 can be driven by any conventional drive means such as, for example, an electric motor 82 and belt 83. As can be seen in FIG. 6, a pair of bearing blocks 84, 86 support an eccentric shaft 88 for rotational movement thereof. The eccentric shaft 88 is rotated by means of the drive belt 82 acting upon a pulley 90 secured to an end of the shaft. Rotatably mounted to the eccentric shaft 88 is a connecting arm 92. The connecting arm 92 is pivotably mounted to a retainer block 94 which is rigidly secured to the bottom wall of the lower trough section 38.

In operation, rotation of the eccentric shaft 88 induces eccentric motion in the connecting arm 92. The eccentric motion of the connecting arm 92 in turn induces an oscillatory motion in the trough structure 12. Specifically, the trough structure 12 is urged vertically and horizontally as the eccentric shaft 88 rotates. The flexible supports 76 resiliently flex in response to the oscillating action. Any material in the upper trough 54 or the lower chamber 56 of the trough structure 12 is thus caused to move in a conveying manner from the upstream end 64 to the downstream end 65.

Separation occurs as a mixture of liquids and solids is deposited on the deflector plate 63 in the trough structure 12. Since the mixture is relatively fluid, the wall portion 52 of the upper frame member 36 tends to retain the fluid within the upper trough 54. Oscillating motion of the trough structure 12 conveys the material downstream on the surface of the filter means 14. The size of the mesh in the filter medium determines the size of the particulate solids to be separated from the mixture. Different sizes of mesh are commercially available for different sizes of filtering, even to filtering particles as small as one micron. The liquid portion of the mixture tends to flow downwardly through the filter medium and through the perforated flexible sheet into the lower chamber by gravity. The downward flow can be enhanced, depending upon the viscosity of the liquid, by drawing a vacuum beneath the filter means 14 using the vacuum mechanism 16.

When the mixture includes solid particles of a size only significantly larger than the mesh of the filter medium, the oscillation of the trough structure tends to keep the filter medium unobstructed by solids. Where, however, the solid particles in the mixture are significantly smaller, the filter medium tends to clog. The flexible perforated sheet 60 permits employment of a novel way to keep the filter medium 58 unobstructed. Specifically, as the perforated sheet flexes, solid material which tends to cake on the filter medium 58 is broken up and conveyed downstream by the oscillating motion of the trough structure 12. Various means may be employed to flex the perforated sheet. For example, the vacuum may be pulsed by repeatedly turning the vacuum pump 68 off and on which will bend the flexible perforated sheet 60 alternatively downwardly and upwardly, carrying the filter medium 58 with it. Any caked solids in the filter 58 or between the filter and the flexible sheet 60 are thus broken up. Continuous flexing of the sheet tends to prevent the solids from caking and facilitates movement of the solids toward the downstream end 65 to exit from the trough structure 12.

It is also possible to direct a number of lightweight plastic balls 96 against the perforated sheet 60 within the lower chamber 56. A plurality of rods 98 extending laterally within the lower chamber 56 between the side walls 46 thereof enhance random bouncing of the balls in the lower chamber caused by the oscillating mechanism 20. The impact of the balls on the sheet 60 will generate additional vibration throughout the flexible sheet to prevent the smaller particles in the mixture from clogging the filter medium 58.

As the mixture travels downstream along the surface of the filter means 14, it becomes increasingly drier until there is a substantially dry solid particulate material at the downstream end 65 of the upper trough 54. The solids tend to move upwardly along the sloping lip 66 until they fall over the edge where they can be collected in any suitable receptacle (not shown). Meanwhile, the liquid is drawn into the holding tank 35 where it can be subsequently disposed of. The cleaning action provided by the flexible perforated sheet permits the satisfactory separation of a greater percentage of smaller solid particles from a mixture of liquids and solids than was possible in the prior art.

It will be apparent that such cleaning action will enable a separation device according to the invention to be used in many applications. For example, the device can be used as a washer for cleaning small or moderately sized chips or particles. The material to be washed may be placed in the trough and bathed in a solvent by a continuous spray or similar mechanism. Operation of the device will separate the dirty solvent from the particles. Similarly, mechanical parts can be cleaned whereby the oscillation of the trough will assist the solvent in removal of contaminants from the parts surfaces.

Figure 7:
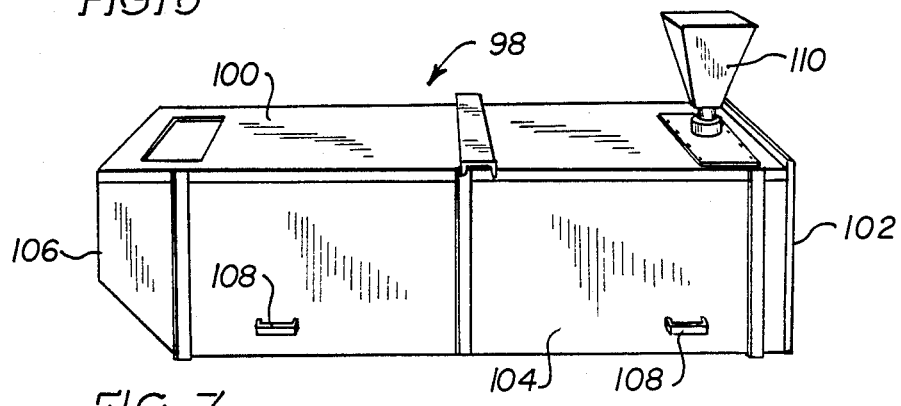
FIG. 7 is a perspective view of a cover for the separation apparatus of FIGS. 1 to 5.

It is preferable during operation of the device according to the invention to cover the device with a hood 98 such as the one shown in FIG. 7. The hood 98 comprises a top wall 100, an upstream end wall 102 and two oppositely disposed lateral walls 104. The hood is open at the bottom and at the downstream end 106. Thus the hood can be placed over the upper trough 54 manually using handles 108 or by some other suitable means. The hoods serves as a splash guard when the device is in operation. A chute 110 is provided to direct the mixture to the deflection plate 63, and the open downstream end 106 permits the solids to be deposited in any suitable receptacle.

It will be understood that reasonable variation and modification of the invention are possible within the scope of the foregoing disclosure and drawings without departing from the spirit of the invention, as defined in the accompanying claims.

The embodiments of the invention in which an exclusive property or privilege is claimed are as follows:

1. In an apparatus for separating liquids and solids from a mixture thereof, comprising:
   a trough structure;
   a generally horizontally extending filter means positioned in said trough structure and adapted to receive a mixture of liquids and solids on its upper surface;
   means for producing a vacuum beneath said filter means to draw the liquids downwardly from the solids to a lower portion of the trough structure; and
   an oscillating means connected to the housing structure to cause the solids on the filter means to move in a conveying direction;
   the improvement which comprises:
   a flexible perforated sheet beneath and in generally continuous contact with the filter means;
   and means for intermittently flexing the perforated sheet comprising means for pulsating the vacuum to maintain the filter means unobstructed by solids.

2. An apparatus for separating liquids and solids from a mixture thereof according to claim 1 wherein said flexible perforated sheet is formed of polypropylene.

3. An apparatus for separating liquids and solids from a mixture thereof according to claim 1 wherein said trough structure has means at a downstream end thereof for directing the solids outwardly of the trough structure.

4. An apparatus for separating liquids and solids from a mixture thereof according to claim 3 wherein said means for directing the solids outwardly of the trough structure comprises a lip formed in the trough structure at a downstream end thereof.

5. An apparatus for separating liquids and solids from a mixture thereof according to claim 4 wherein steps are formed on an inner surface of the lip.

6. An apparatus for separating liquids and solids from a mixture thereof according to claim 1 and further comprising means for withdrawing the liquid from the trough structure.

7. An apparatus for separating liquids and solids from a mixture thereof according to claim 6 wherein said means for withdrawing the liquid from the trough structure comprises at least one duct connecting the lower portion of the trough structure to and in open communication with a holding tank.

8. An apparatus for separating liquids and solids from a mixture thereof according to claim 1 wherein the means for intermittently flexing said perforated sheet further includes a plurality of freely movable balls directed to impact the perforated sheet.

9. A method for separating liquids and solids from a mixture thereof comprising the steps of:
   depositing a mixture of liquids and solids on an upper surface of a generally horizontally extending filter means positioned in a trough structure;
   applying oscillating movement to the trough structure to move the mixture in a conveying direction;
   applying a vacuum beneath said filter means to draw the liquid downwardly from the solids; and intermittently flexing a perforated sheet beneath and in generally continuous contact with the filter means by means comprising means for pulsating the vacuum to maintain the filter means unobstructed by solids.

10. A method for separating liquids and solids from a mixture thereof according to claim 9, wherein the step of intermittently flexing a perforated sheet further includes directing a plurality of freely movable balls against the perforated sheet.

* * * * *